United States Patent [19]

Price

[11] Patent Number: 4,478,911

[45] Date of Patent: Oct. 23, 1984

[54] STONE TREATMENT

[75] Inventor: Clifford A. Price, Long Marston, Nr Tring, England

[73] Assignee: National Research Development Corporation, London, England

[21] Appl. No.: 198,582

[22] Filed: Oct. 20, 1980

Related U.S. Application Data

[63] Continuation of Ser. No. 002,592, Jan. 11, 1979, abandoned, which is a continuation of Ser. No. 818,753, Jul. 25, 1977, abandoned.

[30] Foreign Application Priority Data

Jul. 28, 1976 [GB] United Kingdom ............... 31448/76

[51] Int. Cl.$^3$ ........................... B32B 9/04; C09K 3/00
[52] U.S. Cl. ........................................ 428/332; 106/2; 106/12; 106/13; 106/287.12; 106/287.16; 428/447; 428/540; 528/10; 528/17
[58] Field of Search ............... 428/540, 447, 452, 540, 428/332; 106/2, 12, 13, 287.12, 287.16; 528/17, 10

[56] References Cited

U.S. PATENT DOCUMENTS

| | | | |
|---|---|---|---|
| 2,502,286 | 3/1950 | Sowa | 428/447 |
| 2,568,384 | 9/1951 | Cheronis | 260/46.5 |
| 2,726,176 | 12/1955 | Hatcher | 428/447 |
| 3,328,481 | 6/1967 | Vincent | 260/825 |
| 3,364,246 | 1/1968 | Rossmy | 528/10 |
| 3,620,820 | 11/1971 | Hess | 106/13 |
| 3,704,159 | 11/1972 | Vale Sayre | 428/540 |
| 3,772,065 | 11/1973 | Seiler | 428/447 |
| 3,877,956 | 4/1975 | Nitzsche et al. | 106/2 |
| 3,879,206 | 4/1975 | Nestler | 106/287.13 |
| 3,914,476 | 10/1975 | Nitzsche et al. | 427/337 |
| 4,072,019 | 2/1978 | Pearson | 106/900 |

FOREIGN PATENT DOCUMENTS

| | | |
|---|---|---|
| 313777 | 3/1974 | Austria . |
| 921914 | 5/1947 | France . |
| 665479 | 1/1952 | United Kingdom . |
| 848311 | 9/1960 | United Kingdom . |
| 913523 | 12/1962 | United Kingdom . |
| 1057980 | 2/1967 | United Kingdom . |
| 1126955 | 9/1968 | United Kingdom . |
| 1205394 | 9/1970 | United Kingdom . |
| 1350788 | 4/1974 | United Kingdom . |
| 1357840 | 6/1974 | United Kingdom . |
| 1422739 | 1/1976 | United Kingdom . |

OTHER PUBLICATIONS

Dick, J. B., *Building Research Establishment: Some Work in Progress*, Chemistry & Industry, Apr. 17, 1976, pp. 339-347.

Price, C. A., *The Decay of Natural Bld. Stone*, Chemistry in Britain, vol. 11, No. 10, Oct. 1975, pp. 350-353.

*Primary Examiner*—Theodore Morris
*Attorney, Agent, or Firm*—Oblon, Fisher, Spivak, McClelland & Maier

[57] ABSTRACT

A process for the treatment of a porous inorganic material e.g. stone, comprises contacting the porous inorganic material with a single phase liquid mixture comprising alkoxysilane, water, organic solvent and a silanol polymerization catalyst. There is also included a liquid treatment for a porous inorganic material in the form of a single phase liquid mixture, comprising alkoxysilane, water, organic solvent and a silanol polymerization catalyst; which mixture may be supplied in the form of a pack comprising an assembly of containers which contain the various components of the mixture either separated from one another or in suitable admixture.

7 Claims, No Drawings

STONE TREATMENT

This is a continuation of application Ser. No. 002,592, filed Jan. 11, 1979, which is a continuation application of Ser. No. 818,753, filed July 25, 1977, both now abandoned.

This invention relates to the treatment of porous inorganic materials and in particular to the treatment of natural stone.

Natural stone has been used widely throughout the course of history as a construction material for both structural and ornamental work. Over extended periods of time, however, some types of stone suffer serious decay which can lead to the virtual destruction of carved works of high artistic merit and historical interest, and may even render buildings structurally unsound. Consequently stone treatments have been proposed to arrest decay and consolidate damaged stonework.

Most types of stone decay involve penetration of water into the stone, for example, as salt solutions which crystallise and exert disruptive forces. Thus primary aims of stone treatments are exclusion of water and encapsulation of salts within the stone, and water repellent surface treatments, such as solutions or emulsions of waxes, resins, fats and metallic soaps, and also recently silicones and siliconates, have been used to exclude water. These treatments, however, have not been satisfactory and in some cases even accelerate decay, as water is still able to pass through the treated surface layer via imperfections or in the vapour phase and collect beneath the stone surface and cause decay. More recently deeper protective treatments have been proposed using monomer or prepolymer materials which are polymerised in situ in the stone, but these in situ treatments have not been altogether successful in producing the desired polymer distribution beneath the stone surface. An improved in situ treatment has now been devised which gives rise to a more satisfactory distribution of polymer within the stone; preferably providing a substantial water repellent barrier beneath the stone surface and conveniently also strengthening stone which may have become weakened by decay.

According to the present invention a process for the treatment of a porous inorganic material comprises contacting the porous inorganic material with a single phase liquid mixture comprising alkoxysilane, water, organic solvent and a silanol polymerisation catalyst.

The process of the invention may be used for treatment of porous inorganic materials in general, including porous inorganic building materials, such as concrete, concrete blockwork, mortar and brick, and also ceramic materials. In a particularly preferred embodiment, however, the process is used for treatment of natural stone, usually in the context of its use as a construction material for both structural and ornamental work.

Accordingly thus, the present invention includes a process for the treatment of natural stone comprising contacting the stone with a single phase liquid mixture comprising alkoxysilane, water, organic solvent and a silanol polymerisation catalyst.

In a further particular embodiment the process is used for treatment of archaeological artefacts.

The invention also includes a liquid treatment for porous inorganic materials in the form of a single phase liquid mixture, comprising alkoxysilane, water, organic solvent and a silanol polymerisation catalyst.

Typically the alkoxysilane component of the liquid mixture consists of at least one alkoxysilane which is capable of undergoing hydrolysis to a silanol and subsequent condensation to a silicone. Usually the alkoxysilane component comprises alkoxyalkylsilane to give an alkyl substituted product exhibiting advantageous water-repellent properties. Additionally, or alternatively, the alkoxysilane component may comprise alkoxyarylsilane, though experience suggests that this is not as desirable as the use of alkoxyalkylsilane. Preferably the silicone product is a solid e.g. a glassy solid, and thus the alkoxysilane component does not usually consist entirely of dialkoxydialkylsilane as this gives rise to a linear polymer product which may be liquid at ambient temperatures. Thus the alkoxysilane component may comprise tetra-alkoxysilane, trialkoxyalkylsilane, dialkoxydialkylsilane or alkoxytrialkylsilane, or a mixture of some or all of these. For example, various silanes may be blended together, as is well known in the polysiloxane art, to give polymer products of desired properties, e.g. addition of dialkoxydialkylsilanes, such as diethoxydimethylsilane, improves flexibility of the product. Generally silanes having lower alkoxy, such as ethoxy or methoxy, substituents and lower alkyl such as ethyl or methyl, substituents are preferred. Examples of alkoxy silanes which have been found to be particularly suitable for use in the present invention are tetraethoxysilane, trimethoxymethylsilane, triethoxymethylsilane, diethoxydimethylsilane.

The organic solvent component of the mixture may be any suitable organic solvent or mixture of organic solvents which render the alkoxysilane and water components of the mixture miscible to give a single phase liquid mixture, and may comprise both polar and non-polar organic solvents. Thus the organic solvent component may comprise an appropriate aliphatic or aromatic hydrocarbon solvent and may also comprise ketones, ethers or alcohols. Preferred solvents are lower alkyl alcohols, e.g. alcohols of carbon chain length of up to about $C_4$, and methanol or especially ethanol, e.g. in the form of methylated spirit, have proved to be highly satisfactory as solvents for use in the present invention.

The catalyst component of the mixture comprises a substance which catalyses the production of polysiloxanes, for instance by catalysis of the condensation of silanols and alkoxysilanes, and may include those catalysts which are well known in the polysiloxane art. Thus suitable catalysts may include organic amines, condensation products of an aliphatic aldehyde and an aliphatic primary amine, metal salts of carboxylic acids and hydroxy carboxylic acids and organo-titanium compounds, for instance those catalysts which are mentioned in U.S. Pat. No. 3,328,481. Examples of such catalysts are amines such as n-hexylamine, dipropylamine, diethylamine and t-butylamine, and metal carboxylates such as acetates, propionates and naphthenates, preferably lead carboxylates e.g. lead naphthenate. Preferred catalysts, however, are metal soaps, particularly lead soaps, such as those which find alternative use as paint driers, and "Manosec Lead-36" a proprietary paint drier consisting of a lead soap in white spirit has been found to be particularly apt as a catalyst for use in the present invention.

The relative proportions of the components of the liquid mixture may be varied widely, Preferably, however, the water and alkoxysilane components are present in approximately stoichiometric proportions to provide for complete hydrolysis of the alkxoy groups, though lower proportions of water may be used. The stone undergoing treatment may itself contain some water and this may contribute to the water required for hydrolysis of alkoxy groups. Preferably also the amount of organic solvent used in the mixture is not significantly greater than the minimum amount required to render the alkoxysilane and water miscible. The amount of catalyst used may be varied widely, for instance to effect the gel time of the mixture, increases in catalyst concentration usually decreasing the gel time.

It will be appreciated that once the liquid mixture of the present invention is formulated hydrolysis of the alkoxysilane component commences and subsequent polymerisation and gelling of the mixture is inevitable. Consequently it is desirable to maintain certain of the components separate from one another prior to use, and the liquid treatment of the invention may be supplied as a pack comprising an assembly of containers which contain the various components of the mixture which may be either separated from one another or in suitable admixture. Such packs are included within the scope of the invention. Essentially the water and alkoxysilane should be maintained separately, and generally it is also advisable to maintain the catalyst and alkoxysilane components apart from one another to avoid the possibility of unwanted polymerisation, for instance after chance exposure to atmospheric water. For example, the treatment may be supplied as a four container pack, one container for each component of the mixture, or as a two container pack, one container for the alkoxysilane component and the other container for the remaining three components, or more preferably as a three container pack, one container for the alkoxysilane another for the water and organic solvent and the remaining container for the catalyst compound. Conceivably also the treatment pack may not of itself comprise the water component, as this may conveniently be supplied by the user; though preferably the water used is of a high state of purity e.g. distilled water, as impurities present can interfere with the catalyst component, for instance when it is a lead salt. Characteristically the pack comprises the various components in the proportions required for formulation of the mixture of the invention, and also or alternatively the pack may be supplied together with instructions or indications to enable the user to formulate the components of the mixture in their required proportions.

The stonework or other porous inorganic material which is undergoing treatment may be contacted with the mixture by any suitable method. Elevated pressure or vacuum techniques may be used to enhance penetration of the mixture, but this is not normally necessary and satisfactory results are usually obtained by simple application of the mixture to the surface of the stone or other porous inorganic material, for instance by brush or spray means. The amount of mixture applied to the stonework may be varied as desired having regard to such parameters as the porosity of the material and the depth of treatment required. For example, application of about 5 liters of mixture per square meter to stonework having a porosity of about 20% by volume has generally been found to be adequate producing a polymer impregnated layer to a depth of about 25 mm or more.

Subsequent to formulation the mixtures of the present invention typically undergo surprising changes in physical properties, particularly changes in viscosity, which it is believed make the mixtures highly attractive from the stone treatment point of view. It has been found quite unexpectedly that the viscosity of the mixture remains at a substantially constant low level for an initial period of up to several hours e.g. from about 2 up to about 5 hours or more, and then undergoes a very rapid and dramatic increase as the mixture gels. Without prejudice it is believed that the initial period of low viscosity may permit deep penetration e.g. up to 50 mm or more, of the mixture into the stone, and that the rapid increase in viscosity may conveniently check the depth of this penetration and thus determine the distribution of polymer within the stone. The gelling time and hence depth of penetration of the mixture may be adjusted, for instance by variation of the mixture composition, e.g. variation of the catalyst component.

In a preferred embodiment the present invention includes a liquid stone treatment in the form of a single phase liquid mixture comprising alkoxysilane, water, organic solvent and a silanol polymerisation catalyst, said liquid on formulation having a viscosity which remains at a substantially constant low level for a period of up to several hours, preferably from about 2 to about 5 hours, and then increases rapidly as the mixture gels. The invention also includes a process of stone treatment using such a liquid mixture, in which the stone is contacted with the mixture whilst in the initial period of low viscosity, preferably immediately after formulation of the mixture or soon thereafter, and during this period the mixture is permitted to penetrate into the stone, preferably to a depth of at least 15 mm, until the viscosity of the mixture increases rapidly as it gels.

It is believed that the process of the present invention generally provides a more effective stone treatment than prior art stone treatments, such as the water repellent surface treatment mentioned previously. Typically the present process gives rise to a porous inorganic article having a relatively deep treated layer e.g. to a depth of at least 15 mm, preferably from about 25 mm to about 50 mm or more, beneath its surface, comprising polysiloxanes which are conveniently water repellent. Generally also the present process provides a more desirable polymer distribution than prior art in situ polymerisation stone treatments. Advantageously this silicone layer provides a barrier to penetration of liquid water into the stone, consolidates the stone, and encapsulates salts within the stone, thereby arresting decay.

In some cases the consolidation of the stone may be of more significance than the water repellent nature of the resultant silicone layer. For instance, the process may be used to treat artistic stone work, such as statues, which have been severely weakened by decay, and thereby strengthen the stonework prior to its removal to a museum where the water repellency of the treated layer is of little significance.

The invention is further illustrated in the following examples which relate to the production of single phase liquid stone treatments according to the present invention and to their use for the treatment of stone.

EXAMPLE 1

(a)

A liquid stone treatment according to the present invention is formulated by first admixing 65% (v/v) trimethoxymethylsilane 13% distilled water and 22% industrial methylated spirits and then adding to this mixture, as a catalyst, a volume of 2% "Manosec Lead 36" (Manchem Limited, Manchester, U.K.) in white spirit (lead content 0.72%) equivalent to 1% of the silane/water/solvent mixture. The resultant mixture is a single phase liquid which is initially of comparatively low viscosity (1.3 mN m$^{-2}$) and substantially maintains this level of viscosity until about 5 hours after addition of the catalyst component at which point the viscosity increases very rapidly as the mixture gels.

Immediately after formulation the liquid treatment is applied by brush to the surface of samples of various types of stone until no further mixture will absorb (e.g. coverage of from about 4 up to about 10 l/m$^2$). On subsequent examination of the stone the depths of penetration of the mixture, as judged by the water-repellency of the stone, are found to be 37 mm for Richemont limestone (porosity 28% by volume), 53 mm for Terce limestone (porosity 28% by volume) and 25 mm for Whatstandwell sandstone (porosity 15% by volume).

Other solvents besides methylated spirits are used to achieve miscibility of the silane and water and examples of alternative treatment mixes are given below.

(b)

67% (v/v) trimethoxymethylsilane
14% (v/v) distilled water
19% (v/v) methanol
"1%" (v/v) 2% "Manosec Lead 36" in white spirit or (c)

55% trimethoxymethylsilane
11% distilled water
33% acetone
+"1%" 2% "Manosec Lead 36" in white spirit These alternative mixes exhibit similar properties and the characteristic pattern of viscosity changes as for the trimethoxymethylsilane/water/methylated spirits system although the curing times of the polymer may differ slightly. In practice it may be desirable to increase the concentration of the catalyst e.g. by 100 or 200%, to counteract the effects of contamination in the stone or on its surface. Furthermore alternative catalysts are used including metal carboxylates such as lead naphthenates (e.g. up to about 0.2% by volume of lead naphthenate), and also amines though these tend to cause yellowing of the polymer product.

EXAMPLE 2

Liquid stone treatments are also formulated using triethoxymethylsilane as an alternative to trimethoxymethylsilane, and again these exhibit similar properties and the characteristic pattern of viscosity changes as in example 1(a). These mixes are also applied by brush immediately after formulation to the surface of stonework into which they penetrate forming a relatively deep polymer layer. Examples of typical mixes using triethoxymethylsilane are given below (a)

60% triethoxymethylsilane
8% distilled water
32% industrial methylated spirits
+"1%" 2% "Manosec Lead 36" in white spirit (b)

64% triethoxymethylsilane
9% distilled water
27% methanol
+"1%" 2% "Manosec Lead 36" in white spirit (c)

44% triethxoymethylsilane
6% distilled water
50% acetone
+"1%" 2% "Manosec Lead 36" in white spirit The treatment mixes described in Examples 1 and 2 may be supplied to the user in the form of packs in which the alkoxysilane component is maintained separate from both the water and the catalyst components.

I claim:

1. In a process of treatment of a porous inorganic material in which the porous inorganic material is impregnated with a single lead phase liquid mixture comprising alkoxymethyl or alkoxyethylsilane, water, an organic solvent and a silanol polymerization catalyst, and in which the mixture is permitted to penetrate into the said porous material for an initial period of at least two hours at ambient temperature, after which gelation rapidly takes place, the improvement comprising: impregnating said porous inorganic material with said single phase liquid mixture containing a lead soap or a lead carboxylate salt as the silanol polymerization catalyst.

2. The process of claim 1, wherein said silanol polymerization catalyst is lead naphthenate.

3. The process of claim 1, wherein said porous inorganic material comprises natural stone.

4. The process of claim 1, wherein said single phase liquid mixture penetrates to a depth of at least 15 mm into said porous material.

5. In a single phase liquid composition for impregnating a porous inorganic material, said composition comprising an alkoxymethyl or alkoxyethylsilane, water, an organic solvent and a silanol polymerization catalyst, the improvement wherein said silanol polymerization catalyst comprises a lead soap or a lead carboxylate salt.

6. The composition of claim 5, in the form of a package comprising an assembly of 3 or 4 containers which contain (1) the alkoxymethyl or alkoxymethylsilane in a first container, (2) the organic solvent in a second container, (3) the catalyst in a third container, and (4) water in said second container or in a fourth container.

7. The composition of claim 5, wherein said polymerization catalyst is lead naphthenate.

* * * * *

UNITED STATES PATENT AND TRADEMARK OFFICE
CERTIFICATE OF CORRECTION

PATENT NO. : 4,478,911

DATED : OCTOBER 23, 1984

INVENTOR(S) : CLIFFORD A. PRICE

It is certified that error appears in the above-identified patent and that said Letters Patent is hereby corrected as shown below:

Claim 1, line 3: after "single" cancel "lead"

Claim 6, line 3: change "alkoxymethylsilane" to "alkoxyethylsilane"

Signed and Sealed this

Ninth Day of July 1985

[SEAL]

Attest:

DONALD J. QUIGG

Attesting Officer     Acting Commissioner of Patents and Trademarks